(12) United States Patent
Kadobayashi et al.

(10) Patent No.: US 10,905,531 B2
(45) Date of Patent: Feb. 2, 2021

(54) MILL BLANK FOR DENTAL CAD/CAM WITH GROOVE NOT EXTENDING OVER WHOLE OF CIRCUMFERENCE

(71) Applicant: SHOFU INC., Kyoto (JP)

(72) Inventors: Yusei Kadobayashi, Kyoto (JP); Masako Shigezawa, Kyoto (JP)

(73) Assignee: SHOFU INC., Kyoto (JP)

( * ) Notice: Subject to any disclaimer, the term of this patent is extended or adjusted under 35 U.S.C. 154(b) by 314 days.

(21) Appl. No.: 15/662,557

(22) Filed: Jul. 28, 2017

(65) Prior Publication Data
US 2018/0028295 A1 Feb. 1, 2018

(30) Foreign Application Priority Data

Jul. 29, 2016 (JP) .................. 2016-149278
Mar. 3, 2017 (JP) .................. 2017-040007

(51) Int. Cl.
*A61C 13/00* (2006.01)
*A61C 13/08* (2006.01)

(52) U.S. Cl.
CPC .......... *A61C 13/0022* (2013.01); *A61C 13/08* (2013.01)

(58) Field of Classification Search
CPC .................................................. A61C 13/0022
See application file for complete search history.

(56) References Cited

U.S. PATENT DOCUMENTS

| 6,709,694 B1 | 3/2004 | Suttor et al. | |
| 6,713,421 B1* | 3/2004 | Hauptmann | C04B 35/486 433/202.1 |
| 2006/0141250 A1* | 6/2006 | Basler | A61C 13/0022 428/364 |
| 2007/0275352 A1 | 11/2007 | Gubler et al. | |
| 2010/0221683 A1 | 9/2010 | Franke et al. | |
| 2016/0317258 A1* | 11/2016 | Steger | A61C 13/0022 |
| 2017/0056140 A1 | 3/2017 | Goto et al. | |
| 2017/0065381 A1 | 3/2017 | Schuetz | |

FOREIGN PATENT DOCUMENTS

| DE | 10 2011 055 393 | 5/2013 |
| EP | 2 384 718 | 11/2011 |
| EP | 3 067 013 | 9/2016 |

(Continued)

OTHER PUBLICATIONS

Notification of Reasons for Refusal dated Sep. 14, 2016 in corresponding Japanese Application No. JP2016-149278, with English translation.

(Continued)

*Primary Examiner* — Ian A Rummel (74) *Attorney, Agent, or Firm* — Wenderoth, Lind & Ponack, L.L.P.

(57) ABSTRACT

To provide a mill blank for dental CAD/CAM for preparing a dental restoration by being installed in a CAD/CAM device, wherein, the mill blank for dental CAD/CAM has a substantially columnar shape, the mill blank for dental CAD/CAM has at least one recess in a circumference portion, the recess does not extend over the whole of the circumference portion of the mill blank for dental CAD/CAM, and the recess of the mill blank for dental CAD/CAM is to be engaged with the CAD/CAM device.

8 Claims, 5 Drawing Sheets

(56) References Cited

FOREIGN PATENT DOCUMENTS

| | | |
|---|---|---|
| EP | 3 095 412 | 11/2016 |
| JP | 2002-536280 | 10/2002 |
| JP | 2010-534245 | 11/2010 |
| JP | 2012-5874 | 1/2012 |
| JP | 2015-62691 | 4/2015 |
| JP | 5927331 | 6/2016 |
| WO | 2009/154301 | 12/2009 |
| WO | 2010/094922 | 8/2010 |
| WO | 2013/072287 | 5/2013 |
| WO | 2016/019114 | 2/2016 |

OTHER PUBLICATIONS

Extended European Search Report dated Dec. 5, 2017 in corresponding European Application No. 17183802.2.
Office Actioned dated Nov. 21, 2018 in corresponding European Application No. 17183802.2.
Office Actioned dated Sep. 4, 2019 in corresponding European Application No. 17183802.2.

* cited by examiner

MILL BLANK FOR DENTAL CAD/CAM WITH GROOVE NOT EXTENDING OVER WHOLE OF CIRCUMFERENCE

CROSS-REFERENCE TO RELATED APPLICATIONS

This application is based on and claims the benefit of priority from Japanese Patent Application Serial No. 2016-149278 (filed on Jul. 29 2016) and of priority from Japanese Patent Application Serial No. 2017-040007 (filed on Mar. 3 2017), the contents of which are hereby incorporated by reference in their entirety.

BACKGROUND OF THE INVENTION

Field of the Invention

The present disclosure relates to a mill blank for dental CAD/CAM used for preparing a dental restoration.

Description of the Related Art

In the dental field, it is known that a dental restoration is prepared by cutting a mill blank by using a CAD/CAM technique. In recent years, a plurality of dental restorations are prepared by cutting one mill blank by using this CAD/CAM technique.

Further, a dental restoration may be prepared from a remaining portion of a mill blank after cutting out other dental restoration. On CAD software, it is possible that a dental restoration is designed in a mill blank so as to avoid a portion from which other dental restoration was cut out in order to further cut and machine the dental restoration from a remaining portion of the mill blank after cutting out other dental restoration. However, when the mill blank is installed in a CAD/CAM device, the directivity in the circumferential direction cannot be recognized. Therefore, the conventional mill blank cannot be easily installed so as to further cut and machine a dental restoration from a remaining portion of the mill blank after cutting out other dental restoration.

Japanese Unexamined Patent Application Publication No. 2012-5874 (JP 2012-5874 A) discloses a mill blank which has a columnar shape and is provided with a circumference groove. However, when this conventional mill blank is installed in a CAD/CAM device, the directivity in the circumferential direction cannot be recognized. Therefore, the conventional mill blank cannot be easily installed so as to further cut and machine a dental restoration from a remaining portion of the mill blank after cutting out other dental restoration.

SUMMARY OF THE INVENTION

Technical Problem

In the conventional mill blank, when the mill blank is installed in a CAD/CAM device, the directivity in the circumferential direction cannot be recognized. Therefore, the conventional mill blank cannot be easily installed so as to further cut and machine a dental restoration from a remaining portion of the mill blank after cutting out other dental restoration.

An object of the present invention is to provide a mill blank which may be easily installed so as to further cut and machine a dental restoration from a remaining portion of the mill blank for dental CAD/CAM after cutting out other dental restoration to solve the above described problem.

Solution to Problem

The present disclosure provides a mill blank for dental CAD/CAM for preparing a dental restoration by being installed in a CAD/CAM device, wherein, the mill blank for dental CAD/CAM has a substantially columnar shape, the mill blank for dental CAD/CAM has at least one recess in a circumference portion, the recess does not extend over the whole of the circumference portion of the mill blank for dental CAD/CAM, and the recess of the mill blank for dental CAD/CAM is to be engaged with the CAD/CAM device.

In the present disclosure, it is preferable that the mill blank for dental CAD/CAM includes a first recess on a top surface in the substantially columnar shape and a second recess on a bottom surface in the substantially columnar shape.

In the present disclosure, it is preferable that the recess is formed over a region that the central angle with the center of gravity of the mill blank for dental CAD/CAM having a substantially columnar shape as a center is within a range from 330° to less than 360° when the mill blank for dental CAD/CAM is viewed from the top surface side or the bottom surface side, and a length on a circumferential surface of an arc portion which is on the circumference surface of the mill blank for dental CAD/CAM having a substantially columnar shape and is not formed with the recess is within a range of 1 to 20 mm.

In the present disclosure, it is preferable that the dimension of the recesses in the axial direction of the mill blank for dental CAD/CAM is within a range of 1 to 5 mm, and the dimension of the recess in the direction toward the center axis from the circumferential surface of the mill blank for dental CAD/CAM is within a range of 1 to 5 mm.

In the present disclosure, it is preferable that a diameter of the mill blank for dental CAD/CAM having substantially columnar shape may be within a range of 5 to 15 cm, and a height of the substantially columnar shape is within a range of 0.7 to 3.0 cm.

In the present disclosure, it is preferable that the mill blank for dental CAD/CAM consists of a ceramic material which is unsintered or is not subjected to final sintering.

In the present disclosure, it is preferable that the ceramic material contains alumina or zirconia at a ratio of 95 wt. % or more.

In the present disclosure, it is preferable that the primary average particle diameter of the ceramic material is within a range of 0.01 to 10 µm.

In the present disclosure, it is preferable that the mill blank for dental CAD/CAM is positioned in the circumferential direction by a portion which is not recessed and is not formed over the whole of the circumference portion.

Advantageous Effects of Invention

According to the present disclosure, when a mill blank for dental CAD/CAM is installed in a CAD/CAM device, the directivity in the circumferential direction may be recognized. Therefore, a mill blank for dental CAD/CAM may be easily installed so as to further cut and machine a dental restoration from a remaining portion of the mill blank for dental CAD/CAM after cutting out other dental restoration.

DETAILED DESCRIPTION OF THE PREFERRED EMBODIMENTS

Now a specific description of the present disclosure is given.

A material of a mill blank for dental CAD/CAM of the present disclosure is not limited particular, and any materials such as a resin material, an inorganic material, and a composite material may be used as the material of a mill blank for dental CAD/CAM of the present disclosure. Preferable resin materials include an acrylic resin material, preferable inorganic materials include ceramic material such as an aluminosilicate glass, zirconia and alumina, and preferable composite materials include a mixed material of an acrylic resin material and an inorganic powder.

More preferable materials of a mill blank for dental CAD/CAM include a ceramic material which is unsintered or is not subjected to final sintering. In this case, it is preferable that the ceramic material contains alumina or zirconia at a ratio of 95 wt. % or more. Further, it is preferable that the primary average particle diameter of the ceramic material is within a range of 0.01 to 10 μm, in this case.

A mill blank for dental CAD/CAM of the present disclosure is a molded body for cutting out a dental restoration by using a CAD/CAM technique. A mill blank for dental CAD/CAM of the present disclosure may be prepared by pressing a material provided into a mold, heating the pressed material, and curing or temporary calcining by heating the pressed material. A mill blank for dental CAD/CAM may have a substantially columnar shape. In exemplary mill blank for dental CAD/CAM, a diameter may be within a range of 5 to 15 cm, and a height may be within a range of 0.7 to 3.0 cm.

A mill blank for dental CAD/CAM of the present disclosure may have a single layer structure having single color. Further, a mill blank for dental CAD/CAM of the present disclosure may be prepared by molding a plurality of stacked layers having different colors from each other. In this case, a mill blank for dental CAD/CAM may have 2 to 8 layers. Among them, it is preferable that a mill blank for dental CAD/CAM has at least three layers including an enamel color layer, a dentin color layer and a cervical area color layer.

A mill blank for dental CAD/CAM of the present disclosure has at least one recess on a circumference portion. This recess does not extend over the whole of the circumference portion of the mill blank for dental CAD/CAM and is a portion to be engaged with a CAD/CAM device when the mill blank for dental CAD/CAM is installed in a CAD/CAM device.

It is preferable that the recess on the circumference portion of the mill blank for dental CAD/CAM of the present disclosure is formed over a region that the central angle with the center of gravity of the mill blank for dental CAD/CAM having a substantially columnar shape as a center is within a range from 330° to less than 360° when the mill blank for dental CAD/CAM is viewed from the top surface side or the bottom surface side. When the central angle is less than 330°, a contact part between CAM installed with a mill blank for dental CAD/CAM and the mill blank for dental CAD/CAM may decrease. Therefore, a load applied on the contact part may increase to obstruct stable installation. It is preferable that when the central angle is 330° or more, the recess on the circumference portion of the dental mill blank is continuously formed.

Further, it is preferable that a length on a circumferential surface of an arc portion which is on the circumference surface of the mill blank for dental CAD/CAM having a substantially columnar shape and is not formed with the recess is within a range of 1 to 20 mm. When the length on a circumferential surface of the arc portion which is not formed with the recess having a substantially notched cylindrical shape is less than 1 mm, the arc portion which is not formed with the recess may be easily broken. When the length on a circumferential surface of the arc portion which is not formed with the recess having a substantially notched cylindrical shape is more than 20 mm, it may become difficult to recognize the relationship of position by the arc portion which is not formed with the recess. Further, a contact part to be contacted with CAM may decrease to obstruct stable installation. In addition, the recess having a substantially notched cylindrical shape may be easily broken.

It is preferable that the dimension of the recess in the axial direction of the mill blank for dental CAD/CAM is within a range of 1 to 5 mm. Further, it is preferable that the dimension of the recess in the direction toward the center axis (which is an axis on the center of gravity when the mill blank for dental CAD/CAM is viewed from the top surface side or the bottom surface side) from the circumferential surface of the mill blank for dental CAD/CAM (the radial direction dimension between the circumferential surface and the central axis) is within a range of 1 to 5 mm. When the dimension is less than this range, the arc portion may be easily broken. When the dimension is more than this range, a stable installation to CAM device may be obstructed.

It is preferable that the recess is formed so as to have an L-shape in the section cut along a surface including the center axis of the mill blank for dental CAD/CAM. In this case, it is preferable that the recess is formed so as to have in any section cut along a surface including the center axis of the mill blank for dental CAD/CAM as long as the recess exists. Further, it is preferable that the recess has a surface parallel to the center axis and a surface vertical to the center axis. It is possible to stably install to CAM device and to engage without slack.

Next, a specific description is given with reference to the drawings.

Figure 1:
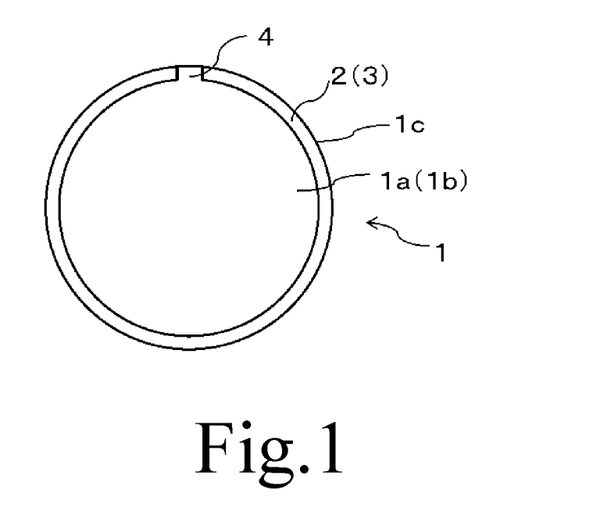
FIG. 1 is a plane view of the mill blank for dental CAD/CAM of the first embodiment of the present disclosure.

FIG. 1 shows a plane view of a mill blank for dental CAD/CAM 1 of the present embodiment as seen from a top surface 1a or a bottom surface 1b of substantially columnar shape. The mill blank for dental CAD/CAM includes a pair of recesses 2 and 3 on a circumference portion (side surface) 1c. The pair of recesses 2 and 3 do not extend over the whole of the circumference portion 1c, and the mill blank for dental CAD/CAM 1 includes an arc portion 4 which is not recessed, in the upper region in FIG. 1. In the present embodiment, the recess 2 opens to the top surface 1a of the mill blank for dental CAD/CAM 1 and the recess 3 opens to the bottom surface 1b of the mill blank for dental CAD/CAM 1. However, the recesses 2 and 3 may be provided so as not to open to the top surface and the bottom surface. The recesses 2 and 3 are portions to be engaged with a CAD/CAM device.

Figure 2:
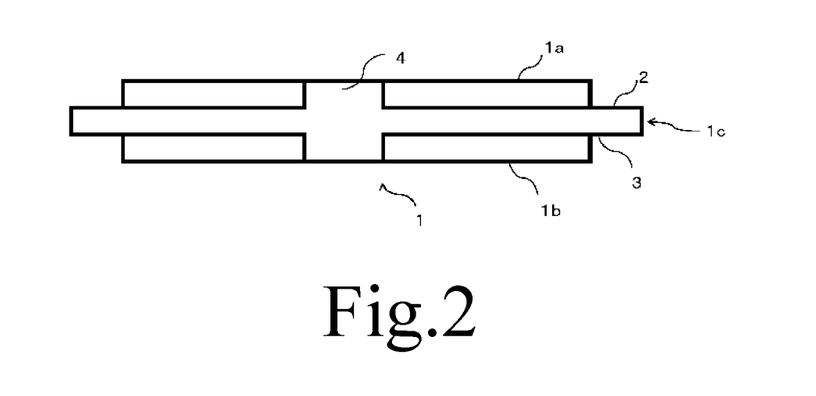
FIG. 2 is a side view of the mill blank for dental CAD/CAM of the first embodiment of the present disclosure.

FIG. 2 shows a side view of the mill blank for dental CAD/CAM 1 of the present embodiment as seen from a side surface (circumference portion 1c) direction of substantially columnar shape on the side of the arc portion 4 which is not recessed. As shown in FIG. 2, the mill blank for dental CAD/CAM 1 has a recess 2 and a recess 3 on a circumferential portion 1c. In FIG. 2, one of the recess 2 and the recess 3 which is not shown in FIG. 1 is shown. As shown in FIG. 2, the recces 2 and the recess 3 do not extend over the whole of the circumference portion 1c, and the mill blank for dental CAD/CAM 1 includes the arc portion 4 which is not recessed, in the central region in FIG. 2. Thus, the mill blank for dental CAD/CAM 1 of the present embodiment includes the arc portion 4 which is not recessed so as to not extend over the whole of the circumference portion 1c. Therefore, in the mill blank for dental CAD/CAM of the present embodiment, the pair of the recesses 2 and 3 do not extend over the whole of the circumference portion 1c.

Thus, the mill blank for dental CAD/CAM 1 of the present embodiment may be positioned in the circumferential direction by the arc portion 4 which does not extend over the whole of the circumference portion 1c and is not recessed.

Figure 3:
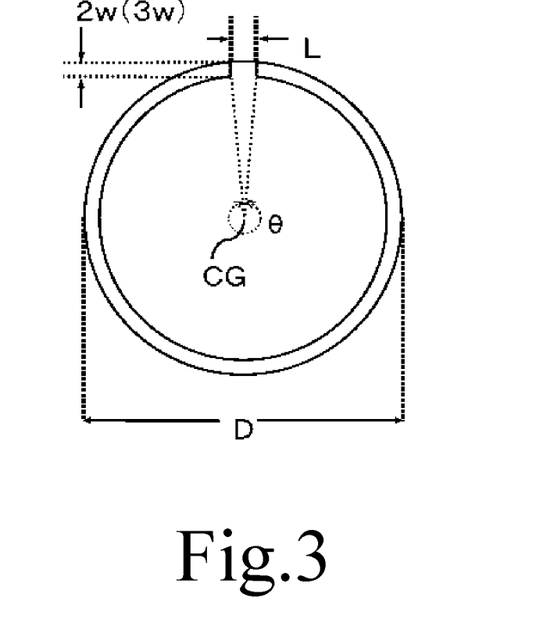
FIG. 3 is a plane view with auxiliary lines of the mill blank for dental CAD/CAM of the first embodiment of the present disclosure.
Figure 4:
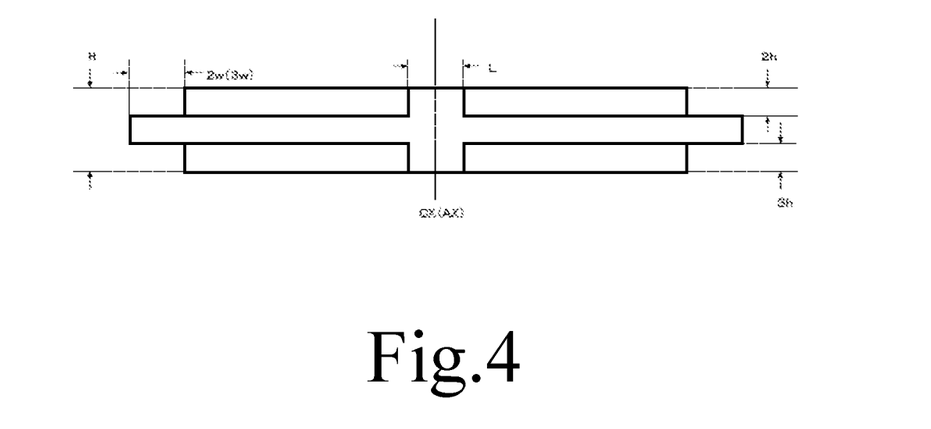
FIG. 4 is a side view with auxiliary lines of the mill blank for dental CAD/CAM of the first embodiment of the present disclosure.

FIG. 3 is a plane view of the mill blank for dental CAD/CAM of the present embodiment, added with auxiliary lines for explaining such as dimension. FIG. 4 is a side view of the mill blank for dental CAD/CAM of the present embodiment, added with auxiliary lines for explaining such as dimension.

As shown in FIG. 3, the recess 2 and the recess 3 are continuously formed over a region that the central angle θ with the center of gravity (center) C of the mill blank for dental CAD/CAM 1 having a substantially columnar shape as a center is within a range from 330° to less than 360° when the mill blank for dental CAD/CAM 1 is viewed from the top surface 1a side or the bottom surface 1b side, respectively. In the present embodiment, a range formed with the recess 2 with the center of gravity (center) C as a center is the same as a range formed with the recess 3 with the center of gravity (center) C as a center when the mill blank for dental CAD/CAM 1 is viewed from the top surface 1a side or the bottom surface 1b side.

Further, in the present embodiment, the length L on the circumferential surface 1c of the arc portion 4 (the distance between one end and other end of recess in circumferential direction) which is on the circumference surface 1c of the mill blank for dental CAD/CAM 1 having a substantially columnar shape and is not formed with the recess 2 and the recess 3 is within a range of 1 to 20 mm.

In addition, the dimensions 2h and 3h of the recesses 2 and 3 in the axial direction AX of the mill blank for dental CAD/CAM 1 of the present embodiment are within a range of 1 to 5 mm. In the present embodiment, the dimension 2h of the recess 2 in the axial direction AX is the same as the dimension 3h of the recess 3 in the axial direction AX. However, the dimension 2h of the recess 2 in the axial direction AX may be different from the dimension 3h of the recess 3 in the axial direction AX.

In the present embodiment, the dimension 2w of the recess 2 in the direction toward the center axis CX (which is an axis on the center of gravity C when the mill blank for dental CAD/CAM 1 is viewed from the top surface 1a side or the bottom surface 1b side) from the circumference portion 1c of the mill blank for dental CAD/CAM 1 (the radial direction dimension 2w between the circumferential surface and the central axis CX) and the dimension 3w of the recess 3 in the direction toward the center axis CX from the circumference portion 1c of the mill blank for dental CAD/CAM 1 (the radial direction dimension 3w between the circumferential surface and the central axis CX) are within a range of 1 to 5 mm. In the present embodiment, the dimension 2w of the recess 2 in the direction toward the center axis CX from the circumference portion 1c is the same as the dimension 3w of the recess 3 in the direction toward the center axis CX from the circumference portion 1c. However, the dimension 2w of the recess 2 in the direction toward the center axis CX from the circumference portion 1c may be different from the dimension 3w of the recess 3 in the direction toward the center axis CX from the circumference portion 1c.

In the mill blank for dental CAD/CAM 1 of the present embodiment, a diameter D of the of the substantially columnar shape may be within a range of 5 to 15 cm, and a height H of the substantially columnar shape may be within a range of 0.7 to 3.0 cm.

The mill blank for dental CAD/CAM 1 of the present embodiment has a three layers structure consisting of an enamel color layer, a dentin color layer and a cervical area color layer. The recess 2 is formed over the whole of the axis direction AX of the enamel color layer. The recess 3 is formed over the whole of the axis direction AX of the cervical area color layer. Further, the enamel color layer, the dentin color layer and the cervical area color layer of the present embodiment are formed so as to have the same dimension in the axial direction AX of the mill blank for dental CAD/CAM 1.

As shown in FIG. 4, the recess 2 and the recess 3 of the present embodiment are formed so as to have an L-shape in the section cut along a surface including the center axis CX of the mill blank for dental CAD/CAM 1. Especially, the recess 2 and the recess 3 of the present embodiment are formed so as to have in any section cut along a surface including the center axis CX of the mill blank for dental CAD/CAM 1 as long as the recess 2 or the recess 3 exists. Specifically, in the present embodiment, the recess 2 has a surface 2a parallel to the center axis CX and a surface 2b vertical to the center axis CX, and the recess 3 has a surface 3a parallel to the center axis CX and a surface 3b vertical to the center axis CX.

Figure 5:
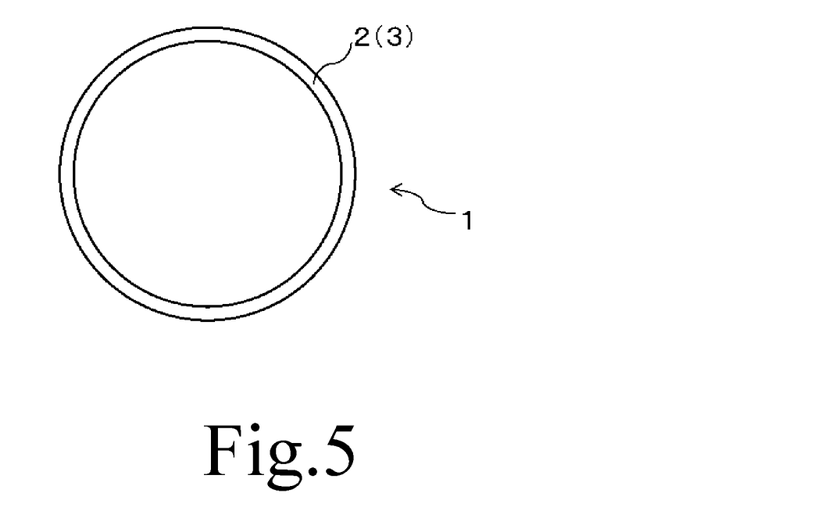
FIG. 5 is a plane view of the conventional mill blank for dental CAD/CAM.

FIG. 5 shows a plan view of a conventional mill blank for dental CAD/CAM as seen from a top surface side or a bottom surface side of substantially columnar shape. As shown in FIG. 5, the conventional mill blank for dental CAD/CAM has a recess on a circumference portion and the recess is formed over the whole of the circumference portion.

Figure 6:
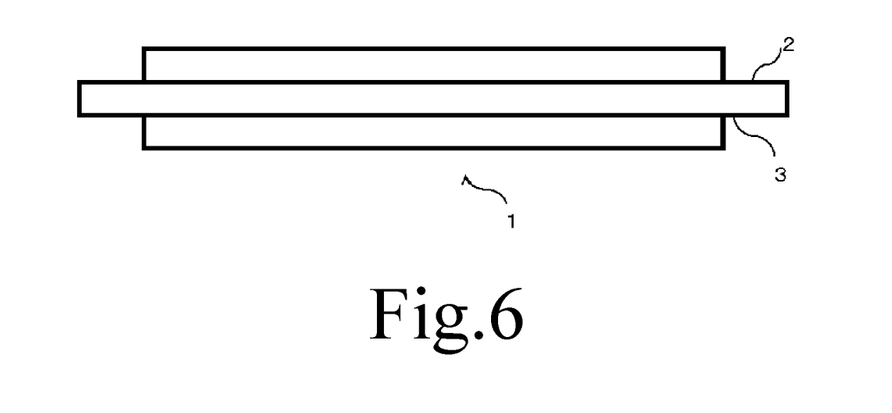
FIG. 6 is a side view of the conventional mill blank for dental CAD/CAM.

FIG. 6 shows a side view of a conventional mill blank for dental CAD/CAM as seen from a side surface side of substantially columnar shape. As shown in FIG. 6, the conventional mill blank for dental CAD/CAM has two recesses 2 on a circumference portion and the recesses are formed over the whole of the circumference portion.

Figure 7:
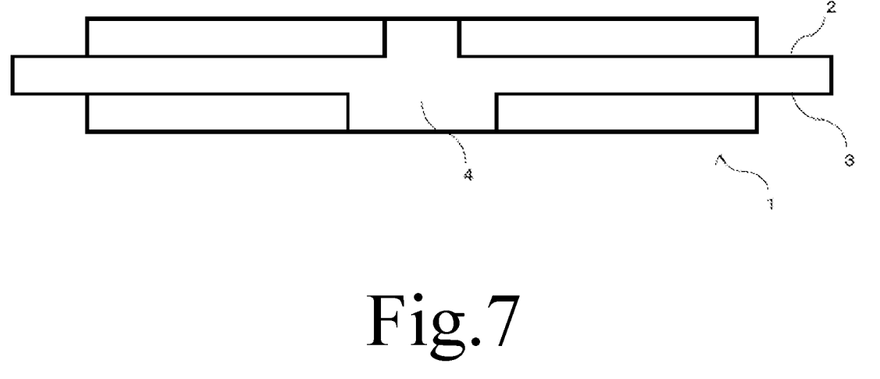
FIG. 7 is a side view of the mill blank for dental CAD/CAM of the second embodiment of the present disclosure.

FIG. 7 shows a side view of a mill blank for dental CAD/CAM 1 of the second embodiment of the present disclosure as seen from a side surface direction of substantially columnar shape on the side of an arc portion 4 which is not recessed. The mill blank for dental CAD/CAM 1 of the present embodiment differs from that of the embodiment shown in FIG. 1 in that the recess 2 is formed in a range with the center of gravity as a center wider than that of the recess 3 when the mill blank for dental CAD/CAM 1 is viewed from the top surface 1a side or the bottom surface 1b side. Thus, the directivity in the axial direction AX of the mill blank for dental CAD/CAM 1 may be confirmed by making the recess 2 into a shape which differ from the shape of the recess 3. Therefore, the mill blank for dental CAD/CAM 1 may be more easily installed so as to further cut and machine a dental restoration from a remaining portion of the mill blank for dental CAD/CAM 1 after cutting out other dental restoration.

Examples of other embodiment that the shape of the recess 2 and the shape of the recess 3 are different from each other includes the embodiment that the dimension of the recess 2 in the axial direction of the mill blank for dental CAD/CAM 1 may be different from the dimension of the recess 3 in the axial direction of the mill blank for dental CAD/CAM 1, the embodiment that the dimension of the recess 2 in the direction toward the center axis CX from the circumferential surface of the mill blank for dental CAD/CAM 1 may be different from the dimension of the recess 3 in the direction toward the center axis CX from the circumferential surface of the mill blank for dental CAD/CAM 1, and the embodiment that the shape of the recess 2 in the section cut along a surface including the center axis CX of the mill blank for dental CAD/CAM 1 may be different from the shape of the recess 3 in the section cut along a surface including the center axis CX of the mill blank for dental CAD/CAM 1 (for example, an L-shape and an arc shape).

Figure 8:
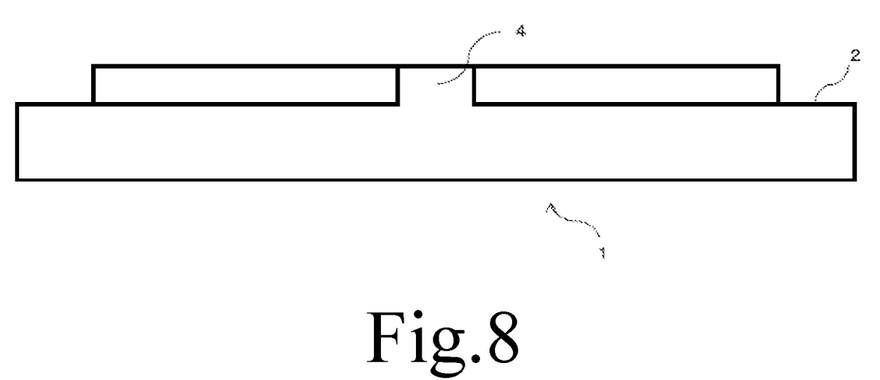
FIG. 8 is a side view of the mill blank for dental CAD/CAM of the third embodiment of the present disclosure.

FIG. 8 shows a side view of a mill blank for dental CAD/CAM 1 of the third embodiment of the present disclosure as seen from a side surface direction of substantially columnar shape on the side of an arc portion 4 which is not recessed. The mill blank for dental CAD/CAM 1 of the present embodiment differs from that of the embodiment shown in FIG. 1 in that the mill blank for dental CAD/CAM 1 of the present embodiment has only a recess 2 opening to the top surface 1a of the mill blank for dental CAD/CAM 1 and does not have a recess 3 opening to the bottom surface 1b of the mill blank for dental CAD/CAM 1. Thus, the directivity in the axial direction AX of the mill blank for dental CAD/CAM 1 may be confirmed by providing only the recess 2 on the top surface 1a (or only the recess 3 on the bottom surface 1b). Therefore, the mill blank for dental CAD/CAM 1 may be more easily installed so as to further cut and machine a dental restoration from a remaining portion of the mill blank for dental CAD/CAM 1 after cutting out other dental restoration.

Figure 9:
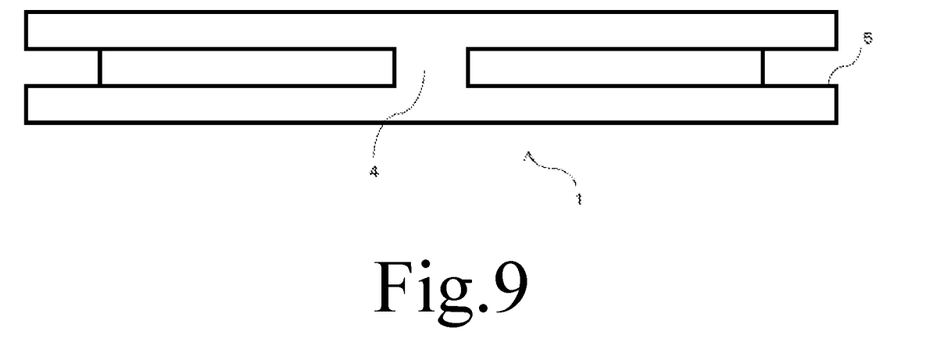
FIG. 9 is a side view of the mill blank for dental CAD/CAM of the fourth embodiment of the present disclosure.

FIG. 9 shows a side view of a mill blank for dental CAD/CAM 1 of the fourth embodiment of the present disclosure as seen from a side surface direction of substantially columnar shape on the side of an arc portion 4 which is not recessed. The mill blank for dental CAD/CAM 1 of the present embodiment differs from that of the embodiment shown in FIG. 1 in that the mill blank for dental CAD/CAM 1 of the present embodiment has only a recess 5 not opening to both the top surface 1a and the bottom surface 1b of the mill blank for dental CAD/CAM 1. Especially, the recess 5 of the present embodiment is formed over the whole of the axis direction AX of a dentin color layer located between an enamel color layer and a cervical area color layer.

With respect to the use of substantially any plural and/or singular terms herein, those having skill in the art can translate from the plural to the singular and/or from the singular to the plural as is appropriate to the context.

Although the description herein has been given with reference to the drawings and embodiments, it should be noted that those skilled in the art may make various changes and modifications on the basis of this disclosure without difficulty. Accordingly, any such changes and modifications are intended to be included in the scope of the embodiments.

INDUSTRIAL APPLICABILITY

A mill blank for dental CAD/CAM of the present disclosure may be specifically used for a disk for preparing a dental restoration by cutting and machining using CAD/CAM technique.

What is claimed is:

1. A mill blank for dental CAD/CAM for preparing a dental restoration by being installed in a CAD/CAM device, wherein,
the mill blank for dental CAD/CAM has a substantially columnar shape having a top surface, a bottom surface and a circumference portion positioned between the top surface and the bottom surface,
the mill blank for dental CAD/CAM has at least one recess in the circumference portion including a recess opening to the top surface and a recess opening to the bottom surface,
the recess opening to the top surface is a first recess that opens to the top surface and the circumference portion in the substantially columnar shape, wherein only the first recess opens to the top surface in the substantially columnar shape and the first recess does not extend over the whole of the circumference portion of the mill blank for dental CAD/CAM in the circumferential direction,
the recess opening to the bottom surface is a second recess that opens to the bottom surface and the circumference portion in the substantially columnar shape, wherein only the second recess opens to the bottom surface in the substantially columnar shape and the second recess does not extend over the whole of the circumference portion of the mill blank for dental CAD/CAM in the circumferential direction, and
the at least one recess of the mill blank for dental CAD/CAM is to be engaged with the CAD/CAM device.

2. The mill blank for dental CAD/CAM of claim 1, wherein
the at least one recess is formed over a region that the central angle with the center of gravity of the mill blank for dental CAD/CAM having a substantially columnar shape as a center is within a range from 330° to less than 360° when the mill blank for dental CAD/CAM is viewed from the top surface side or the bottom surface side, and
a length on a circumferential surface of an arc portion which is on the circumference surface of the mill blank for dental CAD/CAM having a substantially columnar shape and is not formed with the at least one recess is within a range of 1 to 20 mm.

3. The mill blank for dental CAD/CAM of claim 1, wherein
the dimension of the at least one recess in the axial direction of the mill blank for dental CAD/CAM is within a range of 1 to 5 mm, and
the dimension of the at least one recess in the direction toward the center axis from the circumferential surface of the mill blank for dental CAD/CAM is within a range of 1 to 5 mm.

4. The mill blank for dental CAD/CAM of claim 1, wherein
a diameter of the mill blank for dental CAD/CAM having substantially columnar shape may be within a range of 5 to 15 cm, and
a height of the substantially columnar shape is within a range of 0.7 to 3.0 cm.

5. The mill blank for dental CAD/CAM of claim 1, wherein
the mill blank for dental CAD/CAM consists of a ceramic material which is unsintered or is not subjected to final sintering.

6. The mill blank for dental CAD/CAM of claim 5, wherein
the ceramic material contains alumina or zirconia at a ratio of 95 wt. % or more.

7. The mill blank for dental CAD/CAM of claim 5, wherein
a primary average particle diameter of the ceramic material is within the range of 0.01 to 10 μm.

8. The mill blank for dental CAD/CAM of claim 1, wherein
the mill blank for dental CAD/CAM is positioned in the circumferential direction by a portion which is not recessed and is not formed over the whole of the circumference portion.

* * * * *